United States Patent
Slobodyanyuk

(10) Patent No.: US 11,422,245 B2
(45) Date of Patent: Aug. 23, 2022

(54) TARGET GENERATION FOR SENSOR CALIBRATION

(71) Applicant: QUALCOMM Incorporated, San Diego, CA (US)

(72) Inventor: Volodimir Slobodyanyuk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 580 days.

(21) Appl. No.: 16/518,758

(22) Filed: Jul. 22, 2019

(65) Prior Publication Data

US 2021/0025995 A1 Jan. 28, 2021

(51) Int. Cl.
*G01S 7/497* (2006.01)
*G01S 7/48* (2006.01)
*G01S 17/931* (2020.01)
*G05D 1/02* (2020.01)

(52) U.S. Cl.
CPC ............ *G01S 7/497* (2013.01); *G01S 7/4802* (2013.01); *G01S 17/931* (2020.01); *G05D 1/0231* (2013.01); *G05D 2201/0213* (2013.01)

(58) Field of Classification Search
CPC ...... G01S 7/4802; G01S 7/497; G01S 17/931; G01S 2013/9316; G05D 1/0231; G05D 2201/0213

USPC .......................................................... 702/97
See application file for complete search history.

(56) References Cited

U.S. PATENT DOCUMENTS

| | | | |
|---|---|---|---|
| 9,719,801 B1 * | 8/2017 | Ferguson | G01S 13/931 |
| 9,952,317 B2 * | 4/2018 | Valois | G01S 17/08 |
| 2014/0336935 A1 * | 11/2014 | Zhu | G01N 21/4738 |
| | | | 702/3 |
| 2018/0074506 A1 * | 3/2018 | Branson | G06V 10/454 |
| 2019/0236058 A1 * | 8/2019 | Komala | G06F 16/27 |
| 2020/0279395 A1 * | 9/2020 | Buda | G01C 11/06 |

* cited by examiner

*Primary Examiner* — John H Le
(74) *Attorney, Agent, or Firm* — Thien T. Nguyen

(57) ABSTRACT

Various aspects of the present disclosure generally relate to sensor targets. In some aspects, a method may include obtaining a detection resolution of a sensor that is to detect a target on a roadway; obtaining a designated speed limit of the roadway; estimating an exposure time of the target based on the detection resolution and the designated speed limit; determining, based on the exposure time, a target dimension of the target and a quantity of surface depths of the target; generating a code for the target based on the quantity of surface depths, wherein the code corresponds to a physical configuration of the target; and storing, in a mapping associated with the sensor, the code in association with the target to permit the target to be identified by the sensor. Numerous other aspects are provided.

30 Claims, 8 Drawing Sheets

TARGET GENERATION FOR SENSOR CALIBRATION

FIELD OF THE DISCLOSURE

Aspects of the present disclosure generally relate to sensor targets and to target generation for sensor calibration.

BACKGROUND

A vehicle may include a sensor system that includes one or more sensors to determine characteristics associated with the vehicle and/or characteristics associated with an environment of the vehicle. For example, such a sensor system may be configured to detect proximity to an object, roadway information, a location of the vehicle (e.g., relative to a target), and/or the like. The sensor system may include a lidar (which stands for Light Detection and Ranging) sensor that can measure a distance to a target and/or identify a shape (e.g., a three-dimensional representation) of the target.

SUMMARY

In some aspects, a method, performed by a device, may include obtaining a detection resolution of a sensor that is to detect a target on a roadway; obtaining a designated speed limit of the roadway; estimating an exposure time of the target based on the detection resolution and the designated speed limit; determining, based on the exposure time, a target dimension of the target and a quantity of surface depths of the target; generating a code for the target based on the quantity of surface depths, wherein the code corresponds to a physical configuration of the target; and storing, and in a mapping associated with the sensor, the code in association with the target to permit the target to be identified by the sensor.

In some aspects, a device for wireless communication may include memory and one or more processors operatively coupled to the memory. The memory and the one or more processors may be configured to: obtain a detection resolution of a sensor that is to detect a target on a roadway; obtain a designated speed limit of the roadway; estimate an exposure time of the target based on the detection resolution and the designated speed limit; determine, based on the exposure time, a target dimension of the target and a quantity of surface depths of the target; generate a code for the target based on the quantity of surface depths, wherein the code corresponds to a physical configuration of the target; and store, in a mapping associated with the sensor, the code in association with the target to permit the target to be identified by the sensor.

In some aspects, a non-transitory computer-readable medium may store one or more instructions for wireless communication. The one or more instructions, when executed by one or more processors of a device, may cause the one or more processors to: obtain a detection resolution of a sensor that is to detect a target on a roadway; obtain a designated speed limit of the roadway; estimate an exposure time of the target based on the detection resolution and the designated speed limit; determine, based on the exposure time, a target dimension of the target and a quantity of surface depths of the target; generate a code for the target based on the quantity of surface depths, wherein the code corresponds to a physical configuration of the target; and store, in a mapping associated with the sensor, the code in association with the target to permit the target to be identified by the sensor.

In some aspects, an apparatus may include: means for obtaining a detection resolution of a sensor that is to detect a target on a roadway; means for obtaining a designated speed limit of the roadway; means for estimating an exposure time of the target based on the detection resolution and the designated speed limit; means for determining, based on the exposure time, a target dimension of the target and a quantity of surface depths of the target; means for generating a code for the target based on the quantity of surface depths, wherein the code corresponds to a physical configuration of the target; and means for storing, in a mapping associated with the sensor, the code in association with the target to permit the target to be identified by the sensor.

Aspects generally include a method, apparatus, system, computer program product, non-transitory computer-readable medium, user device, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
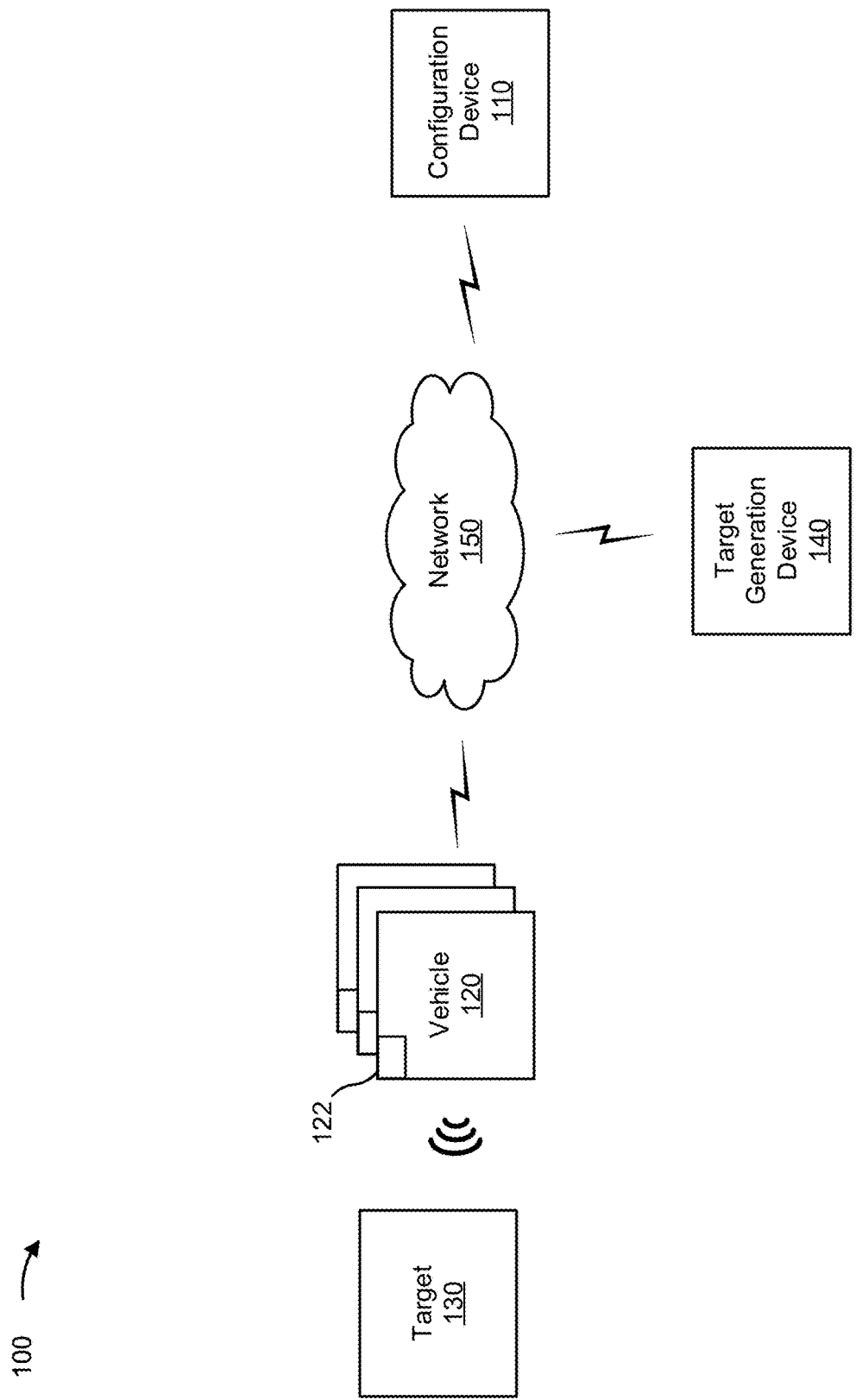
FIG. 1 is a diagram conceptually illustrating an example environment in which target generation for sensor calibration described herein may be implemented, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

In some instances, sensors are configured to detect particular targets. For example, a lidar sensor may be configured to detect a lidar target to identify an object (e.g., an object on which the target is mounted, printed, and/or the like), rather than rely on an analysis of a determined three-dimensional (3D) representation (e.g., a 3D points cloud) of the object. In such instances, identifying a target is considerably faster and simpler than identifying the object, itself, because more resources (e.g., processing resources, communication resources, and/or the like) and/or measurements (e.g., hundreds more, thousands more, millions more) are required to determine a 3D representation of the object that is accurate enough for a sensor to differentiate the object from representations of other objects, especially if the objects are similarly shaped. Accordingly, to permit particular objects to be identified by the sensor (and/or a device coupled to the lidar sensor), targets may be fixed to corresponding objects (e.g., signs, light posts, bridges, vehicles, and/or the like) to enable the sensor to obtain information associated with the objects (e.g., based on a mapping of the targets to corresponding information on associated with objects).

In some instances, such targets may be placed along a roadway to permit a vehicle outfitted with a sensor and/or a device (e.g., a user device or user equipment) outfitted with a sensor to identify the targets and/or determine corresponding information associated with the objects. While a camera sensor may be capable of detecting two-dimensional (2D) targets (e.g., barcodes and/or quick response (QR) codes), the camera sensor is relatively more expensive and needs to utilize more computing resources than a lidar sensor, especially considering the required resolution of the camera sensor to detect a 2D target along a roadway (e.g., because an exposure time to the target may be relatively short due to the camera sensor moving along the roadway). A lidar sensor, which is relatively less expensive and requires fewer resources than a camera sensor, is capable of extended range, but may not be able to distinguish between 2D targets because the lidar sensor is configured to determine a 3D representation of a target (e.g., all 2D targets would merely appear as the shape of the 2D target (e.g., a rectangle, square, circle, and/or the like). Moreover, for a lidar sensor, the greater the distance that a lidar sensor is from the target, the fewer the density of points of the target that can be determined to generate a 3D representation of the target (e.g., due to physical constraints of the lidar sensor).

Some implementations described herein enable target generation for sensor calibration of a lidar sensor. For example, a configuration device may design (e.g., determine a configuration for) a lidar target (which may be referred to in the following examples as a "target") to permit a vehicle equipped with one or more lidar sensors to detect a physical configuration of the target based on characteristics of the roadway, the one or more lidar sensors, and/or the target. A target associated with a particular object, as described herein, may be a unique 3D target that is capable of being identified and/or analyzed to permit a lidar sensor, user device, and/or vehicle traveling along a roadway to determine information associated with the object. In this way, the configuration device may design and/or configure targets that can be detected from relatively far distances (e.g., approximately 50 meters (m) or more) to permit the lidar sensor, user device, and/or vehicle to have an adequate amount of time to identify the target and process information associated with the target (e.g., to determine what the target represents). Accordingly, such targets may improve roadway safety and/or prevent collisions involving vehicles equipped with sensors to detect the targets.

As described herein, the configuration device may consider specific characteristics of a target, a lidar sensor, and/or an environment (e.g., a roadway, a parking lot or parking garage, and/or other type of transportation environment) of the target to design and/or configure the target to have an optimal size and/or optimal shape (e.g., according to a target generation model). A target generated (e.g., designed and/or formed) for sensor calibration, as described herein, may have an optimal size and/or optimal shape to reduce consumption of resources for the targets. For example, the larger the target, the more computing and/or the more materials (e.g., raw materials, such as metals, plastics, natural resources, and/or the like) are required to design, form, and/or analyze the target. Further, a target designed and/or formed, as described herein, may have an optimal size and/or optimal shape in accordance with one or more preferred aesthetics. For example, a relatively larger target (e.g., with length and/or width of 1 m) may be considered less aesthetically appealing than a relatively smaller target (e.g., a target with a length and/or width of less than 1 m). In this way, a configuration device, as described herein, is configured to design a target and/or calibrate a sensor to identify the target based on specifics of an environment of the target.

Although some examples are described herein in connection with one or more targets being used in a roadway environment, the one or more targets may similarly be utilized and/or designed for other types of example environments (e.g., buildings, parks, construction sites, retail environments, industrial environments, manufacturing environments, marine environments, aerospace environments, and/or the like).

FIG. 1 is a diagram of an example environment 100 in which systems and/or methods described herein may be implemented. As shown in FIG. 1, environment 100 may include a configuration device 110, one or more vehicles 120 (referred to individually as "vehicle 120" and collectively as "vehicles 120") with corresponding electronic control units (ECUs) 122 (referred to individually as "ECU 122" and collectively as "ECUs 122"), a target 130, a target generation device 140, and a network 150. Although each of vehicles 120 are shown in FIG. 1 with one corresponding ECU 122, one or more vehicles 120 in environment 100 may include one or more ECUs 122. Devices of environment 100 may interconnect and/or communicate via wired connections, wireless connections, or a combination of wired and wireless connections.

Configuration device 110 includes one or more devices capable of receiving, generating, storing, processing, and/or providing configuration information associated with configuring and/or forming (e.g., manufacturing, creating, and/or the like) target 130. For example, configuration device 110 may include a communication and/or computing device, such as a server, a desktop computer, a laptop computer, a tablet computer, a wireless communication device, or a similar type of device.

In some aspects, configuration device 110 may receive input associated with configuring a manner in which ECU 122 is to calibrate a sensor (e.g., a lidar sensor) of vehicle 120 to permit the sensor to detect target 130, and/or may provide output and/or instructions to ECU 122 to configure vehicle 120 using configuration information based at least in part on the input. For example, the configuration information may include a mapping of target 130 to information associated with an object of target 130, such as identification of the object, a position of target 130 in association with the object, and/or other characteristics of the object.

Vehicle 120 may include any vehicle that includes a sensor system as described herein. For example, vehicle 120 may be a consumer vehicle, an industrial vehicle, a commercial vehicle, and/or the like. Vehicle 120 may be capable of traveling and/or providing transportation via public roadways, may be capable of use in operations associated with a worksite (e.g., a construction site), and/or the like. Vehicle 120 may be controlled (e.g., autonomously and/or semi-autonomously) via ECU 122. Additionally, or alternatively, vehicle 120 may be controlled by an operator.

ECU 122 may include one or more devices capable of receiving, generating, storing, processing, and/or providing information associated with target 130 described herein. For example, ECU 122 may include a communication and/or computing device, such as an onboard computer, a control console, an operator station, or a similar type of device. In some aspects, ECU 122 may include and/or be used to identify target 130 based on measurements from a sensor (e.g., a lidar sensor) of vehicle 120, as described herein. For example, ECU 122 may permit vehicle 120 to have one or more onboard capabilities associated with identifying target 130, analyzing target 130 to obtain information (e.g., from a mapping of target 130 to the information) associated with target 130, processing information associated with the target, and/or performing one or more actions based on the information. For example, ECU 122 may be configured to control vehicle 120 (e.g., steer, accelerate, decelerate, and/or the like) based on the information, present the information via a display of an operator station of vehicle 120 (e.g., to indicate the presence of an object associated with the target), and/or the like.

Target 130 may be any suitable structure capable of being identified by a sensor as described herein. Target 130 may be a passive target that is capable of being identified and/or detected without actively processing and/or transmitting communication signals associated with the sensor. For example, as described herein, target 130 may be a unique 3D structure composed of one or more surfaces (e.g., rectangular surfaces, square surfaces, circular surfaces, triangular surfaces, and/or the like) with various depths (e.g., for depth modulation) to provide relatively simple and/or uniform patterns that can be identified by the sensor (and, correspondingly, ECU 122 and/or vehicle 120). Target 130 may be formed and/or comprised of any suitable material (e.g., metal, plastic, wood, cardboard, and/or the like) that can be detected by the sensor.

Target generation device 140 may include one or more devices capable of forming, assembling, and/or manufacturing target 130 based on information (e.g., a code associated with target 130) received from configuration device 110. For example, target generation device 140 may include a 3D printer, one or more manufacturing devices (e.g., one or more robotic machines, one or more mechanical or assembly devices, one or more molding components or casting components, and/or the like), and/or the like that is capable of receiving (e.g., via a communication device of target generation device 140) data that is representative of a physical configuration of target 130 and forming, assembling, and/or manufacturing target 130 from the data.

The number and arrangement of devices and networks shown in FIG. 1 are provided as one or more examples. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
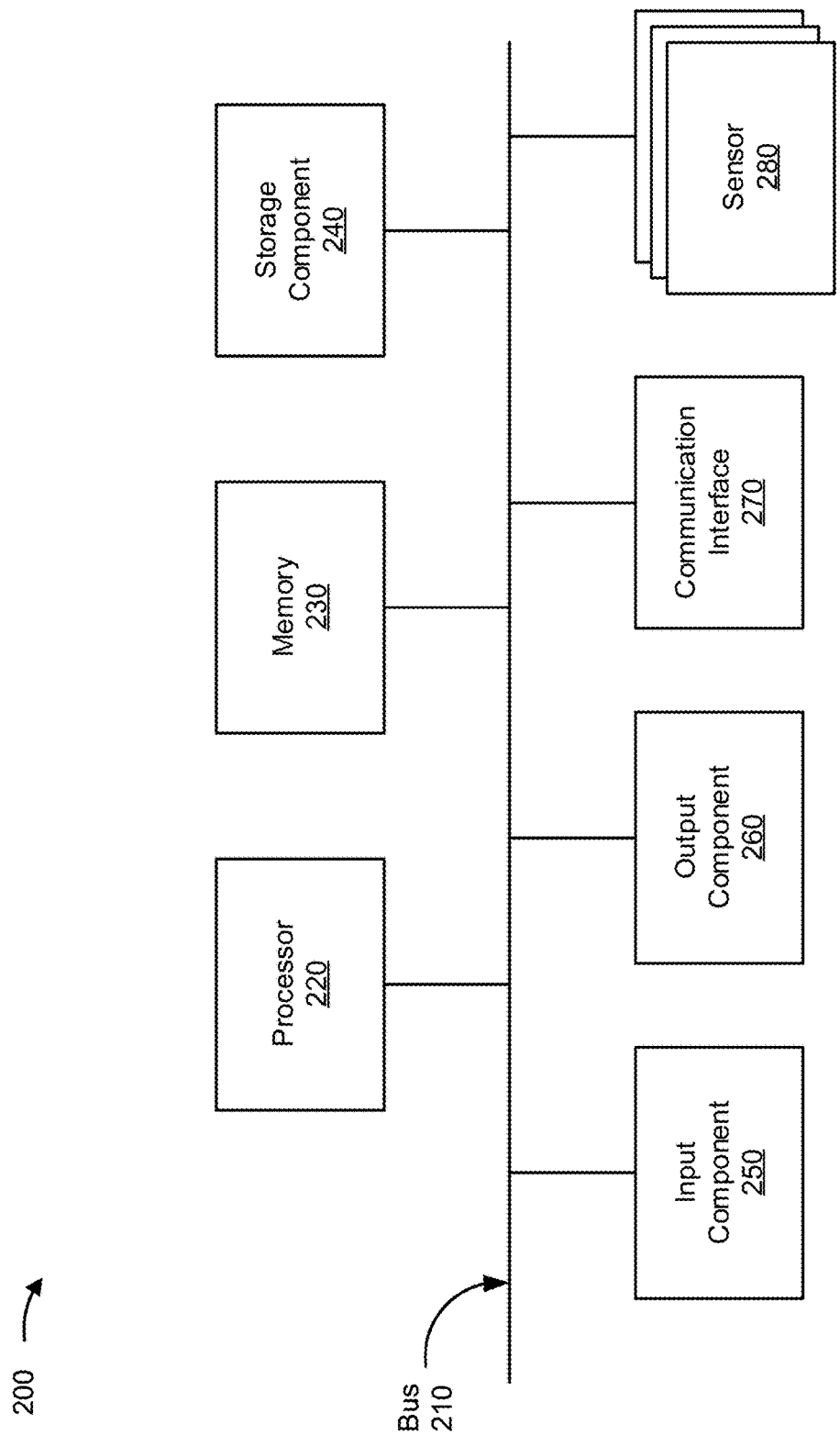
FIG. 2 is a diagram conceptually illustrating example components of one or more devices shown in FIG. 1, in accordance with various aspects of the present disclosure.

FIG. 2 is a diagram of example components of a device 200. Device 200 may correspond to configuration device 110, ECU 122, target generation device 140, and/or the like. In some implementations, configuration device 110, ECU 122, and/or target generation device 140 may include one or more devices 200 and/or one or more components of device 200. As shown in FIG. 2, device 200 may include a bus 210, a processor 220, a memory 230, a storage component 240, an input component 250, an output component 260, a communication interface 270, and one or more sensors 280 (referred to individually as a "sensor 280" and collectively as "sensors 280").

Bus 210 includes a component that permits communication among multiple components of device 200. Processor 220 is implemented in hardware, firmware, and/or a combination of hardware and software. Processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 220 includes one or more processors capable of being programmed to perform a function. Memory 230 includes a random access memory (RAM), a read only memory (ROM), and/or another type of dynamic or static storage device (e.g., a flash memory, a magnetic memory, and/or an optical memory) that stores information and/or instructions for use by processor 220.

Storage component 240 stores information and/or software related to the operation and use of device 200. For example, storage component 240 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 250 includes one or more components that permit device 200 to receive information, such as via user input (e.g., a touch screen display, a keyboard, a keypad, a mouse, a button, a switch, and/or a microphone).

Additionally, or alternatively, input component 250 may include a component for determining location (e.g., a global positioning system (GPS) component) and/or a sensor (e.g., an accelerometer, a gyroscope, an actuator, another type of positional or environmental sensor, and/or the like). In some aspects, input component 250 may include a component (e.g., a hopper, a feeder, a conveyor, and/or the like) that receives raw materials that may be processed by device 200 to generate a physical output (e.g., target 130).

Output component 260 includes one or more components that provide output information from device 200 (via, e.g., a display, a speaker, a haptic feedback component, an audio or visual indicator, and/or the like). Additionally, or alternatively, output component 260 may include a component (e.g., a printer, a 3D printer, a manufacturing device, and/or the like) that provides a physical output (e.g., target 130) from device 200.

Communication interface 270 includes a transceiver-like component (e.g., a transceiver, a separate receiver, a separate transmitter, and/or the like) that enables device 200 to communicate with other devices, such as via a wired connection, a wireless connection, or a combination of wired and wireless connections. Communication interface 270 may permit device 200 to receive information from another device and/or provide information to another device. For example, communication interface 270 may include an Ethernet interface, an optical interface, a coaxial interface, an infrared interface, a radio frequency (RF) interface, a universal serial bus (USB) interface, a Wi-Fi interface, a cellular network interface, and/or the like.

Sensors 280 may include one or more devices capable of sensing one or more characteristics of an environment of device 200. For example, sensors 280 may include one or more of a camera, a lidar sensor, a radar sensor (which stands for Radio Detection and Ranging sensor), and/or the like. Accordingly, sensors 280 may include any suitable sensors that may be configured within a sensor system to perform one or more operations, generate sensor data to permit one or more operations to be performed, and/or the like. For example, sensors 280 may be configured within a sensor system to detect the presence of one or more objects in an environment of device 200, detect a proximity to one or more objects in the environment of device 200, determine a location of device 200, determine a speed associated with a device 200, and/or the like. As described herein, sensor data generated by sensors 280 may be communicated (e.g., via communication interface 270) to another device to permit the sensor data to be used by the other device to perform one or more operations.

Additionally, or alternatively, sensor 280 may include a magnetometer (e.g., a Hall effect sensor, an anisotropic magnetoresistive (AMR) sensor, a giant magnetoresistive sensor (GMR), and/or the like), a location sensor (e.g., a global positioning system (GPS) receiver, a local positioning system (LPS) device (e.g., that uses triangulation, multilateration, and/or the like), and/or the like), a gyroscope (e.g., a micro-electro-mechanical systems (MEMS) gyroscope or a similar type of device), an accelerometer, a speed sensor, a motion sensor, an infrared sensor, a temperature sensor, a pressure sensor, and/or the like.

In some aspects, device 200 includes means for performing one or more processes described herein and/or means for performing one or more operations of the processes described herein. For example, the means for performing the processes and/or operations described herein may include bus 210, processor 220, memory 230, storage component 240, input component 250, output component 260, communication interface 270, sensors 280, and/or any combination thereof.

Device 200 may perform one or more processes described herein. Device 200 may perform these processes based on processor 220 executing software instructions stored by a non-transitory computer-readable medium, such as memory 230 and/or storage component 240. As used herein, the term "computer-readable medium" refers to a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
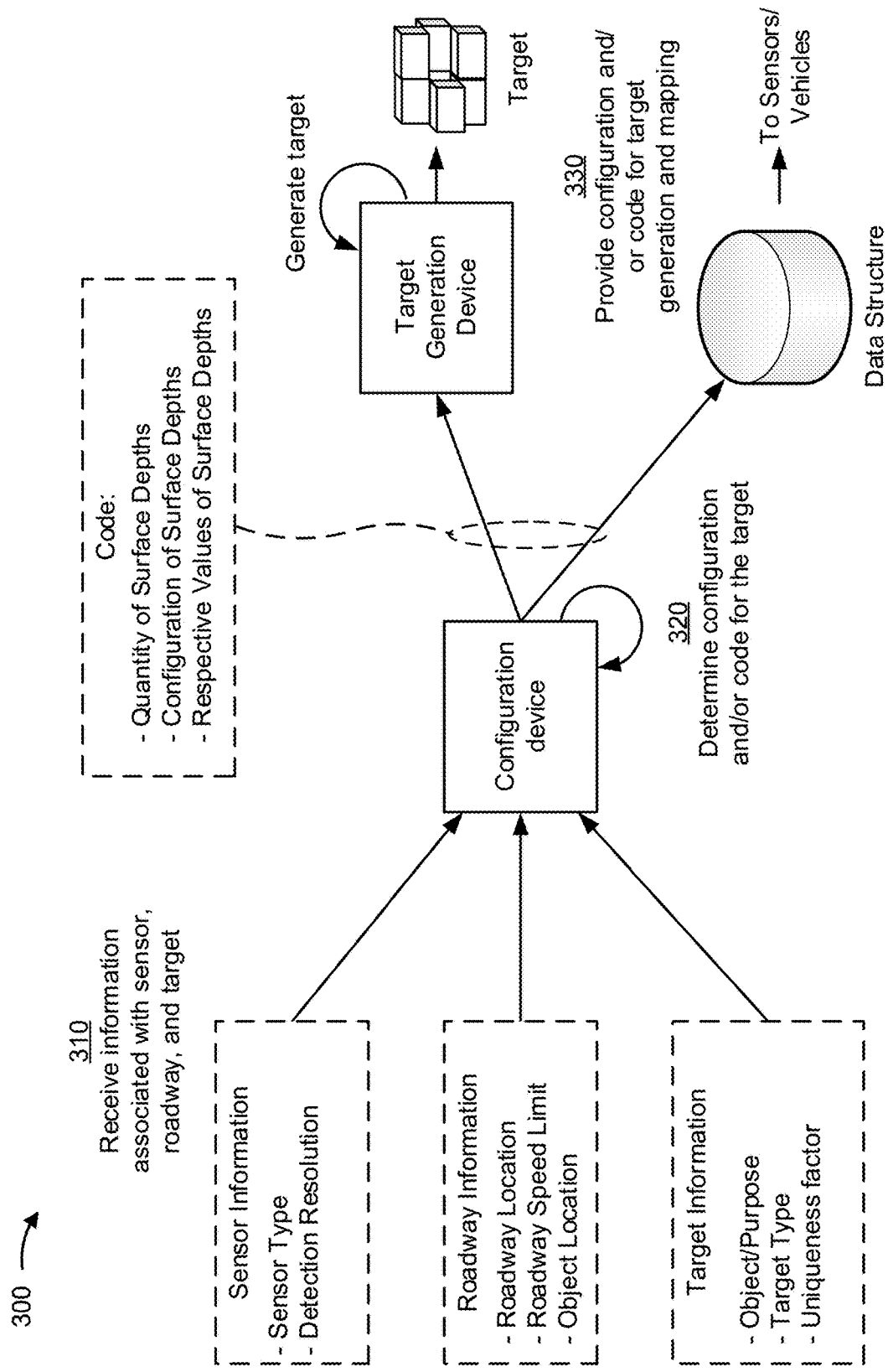
FIGS. 3, 4A, 4B, 5, and 6 are diagrams conceptually illustrating examples associated with target generation for sensor calibration in accordance with various aspects of the present disclosure.

FIG. 3 is a diagram conceptually illustrating an example 300 associated with target generation for sensor calibration in accordance with various aspects of the present disclosure. Example 300 includes a configuration device (e.g., configuration device 110), a target generation device (e.g., target generation device 140), and a data structure (e.g., a data structure associated with configuration device 110 and/or ECU 122). As described herein, the configuration device receives information associated with a sensor, a roadway, and a target, and generates a code associated with the target. The target may be configured to be associated with an object associated with the roadway and used to enable the sensor to identify the object while the sensor is traveling (e.g., within or on a vehicle) along the roadway. Further, as described herein, the configuration device may provide the code to the target generation device to permit the target to be formed by the target generation device, and/or the configuration device may provide the code and/or information associated with the target to a data structure to permit the code to be mapped to the target and/or information associated with the object.

As shown in FIG. 3, and by reference number 310, the configuration device receives information associated with the sensor, the roadway, and the target. As described herein, the configuration device may enable a target to be formed that is specifically based on or custom to the received information. In some aspects, the information may be received from a user interface of the configuration device. For example, a user may provide the information via the user interface to cause the configuration device to determine a configuration for a target as described herein. Additionally, or alternatively, the information may be determined from one or more devices and/or platforms (e.g., roadway monitoring platforms, sensor information databases that store the sensor information, target/object information databases that store information associated with the target and/or object, and/or the like) capable of providing information associated with the sensor, the roadway, and/or the target (or an object associated with the target).

The sensor information may include any details associated with a sensor that is to detect a particular target. For example, the sensor information may include information identifying the type of sensor, a make/model of the sensor, a detection resolution of the sensor, and/or the like. The detection resolution of the sensor may include an azimuthal angular resolution (e.g., 0.06 degrees, 0.08 degrees, 0.12 degrees, and/or the like in an azimuthal direction of the sensor), an elevation angular resolution (e.g., 0.2 degrees, 0.4 degrees, 0.8 degrees, and/or the like), and/or the like. Accordingly, the configuration device may obtain sensor information, including a detection resolution, of the sensor. As described herein, the configuration device may use the detection resolution to determine corresponding maximum operational distances and/or corresponding minimum operational distances associated with the sensor being able to detect various sizes, shapes, and/or types of the target.

The roadway information may include any details associated with a roadway that is within an environment of the target. For example, the roadway information may include information identifying a location of the roadway (e.g., geographical coordinates, altitude information, mileage information, and/or other location/route information associated with the roadway), a location of the object (e.g., geographical coordinates of the object, a location of the object relative to the roadway, and/or the like), a speed limit of the roadway, and/or the like. From the roadway information, the configuration device may determine a maximum detectable distance and/or a minimum detectable distance between the sensor (which would be mounted on a vehicle traveling on the roadway) and a location of the object (e.g., due to curves, altitude changes, and/or possible obstructions in the roadway). Furthermore, the configuration device may determine an exposure time during which the sensor may be able to detect the target along the roadway based on the detection resolution of the sensor, the maximum detectable distance, the minimum detectable distance, and/or the designated speed limit along the roadway. For example, the faster the designated speed limit, the faster the sensor is expected to travel along the roadway, and, thereby, the shorter the length of the exposure time that the sensor may have to detect, identify, and/or process information associated with the target (e.g., before the sensor (or vehicle) reaches a location of the object). In this way, the configuration device may use the roadway information to determine an expected exposure time of the target to permit the configuration device to determine one or more suitable characteristics (e.g., size, shape, type, and/or the like) of the target.

The target information may include any details associated with the target. As shown in the example of FIG. 3, the target information may include the object associated with the target and/or a purpose of the target, a type of the target, and a uniqueness factor of the target. The target information may identify the object and/or information associated with the object (e.g., an identifier of the object, a size of the object, a purpose of the object, a type of the object, and/or the like). Additionally, or alternatively, the target information may include the purpose of the target (e.g., to enable the object to be identified by a sensor of a vehicle, to enable information associated with the object to be identified by the vehicle and/or an operator of the vehicle, to enable control of the vehicle, and/or the like).

The target information may include a type of the target (e.g., one or types of 3D targets) that corresponds to a type of target that was specified or requested by a user, a type of target that corresponds to the environment of the target (e.g., a type of target designated for use along a roadway or other particular type of environment), a type of target that corresponds to the object associated with the target (e.g., a type of target designated for use with a particular type of object), and/or the like. Additionally, or alternatively, the target information may include a uniqueness factor that indicates a degree of uniqueness (or how unique) the target is to be (e.g., one out of a thousand, one out of a million, one out of five million, and/or the like).

In some implementations, the configuration device may determine the type and/or the uniqueness factor of the target based on the object and/or purpose. For example, the configuration device may have access to a mapping of information associated with the object and/or the purpose of the object that indicates a particular type and/or uniqueness factor that is to be considered when determining a configuration of the target for that particular object and/or purpose. Accordingly, the configuration device may receive and/or determine target information associated with a target that is to be configured for a particular object along a roadway.

In this way, the configuration device may receive information associated with the sensor, the roadway, and/or the target to permit the configuration device to determine and/or generate a code for a target based on the information.

As further shown in FIG. 3, and by reference number 320, the configuration device determines a configuration and/or a code for the target. For example, the configuration device may determine a type, a size, a shape, and/or the like for the target. Additionally, or alternatively, the configuration device may generate and/or determine a corresponding code (e.g., a data representation) for the target. The code may be based on the determined and/or selected configuration for the target.

As described herein, the configuration device may determine a size of the target based on an estimated exposure corresponding to a length of time that the target is expected to be exposed (e.g., detectable, within a field of view of, and/or the like) to the sensor as the sensor (and/or vehicle) travels along the roadway. The configuration device may estimate the exposure time based on the detection resolution and/or the designated speed limit of the roadway. For example, using the maximum operational distance and/or the minimum operational distance (e.g., which may be defined by the detection resolution) and/or the maximum detectable distance, the minimum detectable distance, and the designated speed limit of the roadway, the configuration device may estimate the exposure time of the sensor (which may be an estimation because a vehicle traveling along the roadway may not be traveling at the speed limit).

From the exposure time, the configuration device may determine a dimension (e.g., a minimum height, a minimum width, and/or the like) of the target (referred to herein as a "target dimension"). In some implementations, the configuration device may be configured to determine a configuration of the target that has a maximum size or a maximum dimension (e.g., the maximum may correspond to a largest possible target for a particular environment, such as 1 m for a roadway, 0.5 m for an interior of a building, and/or the like). For example, the configuration device may determine that if the estimated exposure time is less than a particular threshold exposure time (e.g., less than 1.5 seconds), then the target is to have the maximum size (e.g., maximum 2D area from one particular direction, a maximum volume, and/or the like) and/or maximum dimension. Additionally, or alternatively, if the exposure time is expected to be greater than a particular threshold (e.g., greater than 1.5 seconds), the configuration device may determine that the target dimension is to be less than the maximum target dimension (e.g., according to a mapping, according to a scale (e.g., a linear scale, an exponential scale, and/or the like)). For example, the configuration device may determine that targets that can be exposed for relatively longer exposure times may have relatively smaller target dimensions (e.g., because more measurements and/or more dense point clouds can be generated for the target, which enables smaller targets to be detected), and that targets that are exposed for relatively shorter times are to have relatively larger target dimensions (e.g., because fewer measurements and/or less dense point clouds can be generated for the target, which requires larger targets so that they can be detected in the limited amount of time).

Furthermore, the configuration device may determine a quantity of surface depths for a target. The quantity of surface depths may be based on the uniqueness factor of the target and the target dimension. For example, the uniqueness factor may indicate that the target is to be unique enough to be distinguishable from certain numbers of other similar targets and/or associated objects, while enabling surface depth sizes to be large enough to be detected given the determine target dimension. In some implementations, the quantity of surface depths for the target may correspond to the number of measurements (and/or frames of data) that can be received by the sensor (e.g., which may be based on the detection resolution). For example, the configuration device may determine that the sensor may have approximately 1.4 seconds of exposure time. Assuming that the sensor may be able to receive 10 data frames per second, then the configuration device may determine that the target is to have 14 surface depths.

In some implementations, the configuration device may determine a configuration of the surface depths that is based on the target dimension and the quantity of surface depths. Accordingly, the sizes and/or shapes of the surface depths may be based on the quantity of the surface depths and the target dimension. Additionally, or alternatively, the sizes and/or shapes of the surface depths may be based on other target information (e.g., the type of target) that predefines and/or identifies characteristics of shapes of the surface depths for the target. According to some implementations, the configuration device may perform a partitioning process to divide the target into a plurality of partitions according to one or more target dimensions.

In this way, the configuration device may determine a configuration of the target so that the target has a particular size, a particular shape, and/or a particular quantity of surface depths that can be identified by the sensor when the sensor is traveling along the roadway at a speed that is within a threshold range associated with the designated speed limit. For example, the threshold range may be between 0 kilometers per hour (kph) to the designated speed limit plus an additional speed threshold (e.g., 10 kph, 20 kph, 25 kph, and/or the like). In some implementations, the threshold range may be between a slowest speed (or an average slow speed) of one or more vehicles and/or a fastest speed (or an average fast speed) of one or more vehicles that were measured and/or reported to the configuration device by a particular device (e.g., one or more sensors of the vehicle).

As described herein, the configuration device may generate a code for the target. For example, the code may correspond to a data representation of the target that includes a plurality of values corresponding to the quantity of surface depths. Accordingly, if a target is to have 14 surface depths, 14 respective code values (e.g., depth values for the surface depths) may be determined and/or generated for the target. The code may be generated using a random generation process, by selecting a unique (or previously unused code), and/or the like. Additionally, or alternatively, the code may be determined based on the type of the target and/or information associated with an object of the target. For example, the configuration device may look up a code for a target using a mapping that associates the object to a particular code for the target.

The code may correspond to a physical configuration of the target. For example, code values of the code (e.g., depth values) may correspond to characteristics of surface depths (e.g., depth levels, surface depth shapes, and/or the like) of a physical configuration of the target.

In this way, the configuration device may determine a configuration and/or generate a corresponding code for the target to permit the target to be mapped to the object and/or formed and/or positioned relative to the object to permit a sensor to detect the target.

As further shown in FIG. 3, and by reference number 330, the configuration device provides the configuration and/or the code for target generation and/or mapping. For example, the configuration device may provide the configuration (e.g., size, shape, surface depth quantity, and/or the like) and/or the corresponding code to the target generation device to permit the target generation device to form, assemble, and/or manufacture the target. Additionally, or alternatively, the configuration device may store the configuration and/or code of the target in a mapping of the data structure. The mapping of the data structure may map the target (and/or the code of the target) to the object and/or information associated with the object.

According to some implementations, based on the configuration device determining a configuration and/or code for the target, the configuration device may send a notification to a control device (e.g., an ECU, such as ECU 122) associated with the sensor to permit the sensor to be calibrated with the new configuration and/or code so that the target can be detected and information associated with an object of the target can be obtained. For example, based on the notification, the control device may obtain (e.g., download, install, and/or the like) a mapping of the target from the data structure. Additionally, or alternatively, the configuration device may provide the mapping to the control device so that the control device can calibrate the sensor to detect the target and/or identify information associated with an object of the target.

In this way, the configuration device may permit and/or cause the target to be formed and/or calibrate a sensor with the mapping to permit the sensor to identify the target (e.g., after the target is positioned along the roadway).

In this way, a target is configured for a sensor (e.g., a lidar sensor) that enables target specific, environment specific, and/or sensor specific calibration to enable optimal and/or efficient use of resources relative to previous techniques, while improving range of detection, thereby improving vehicle safety and preventing catastrophic vehicle events.

As indicated above, FIG. 3 is provided merely as one or more examples. Other examples may differ from what is described with regard to FIG. 3.

Figure 4A:
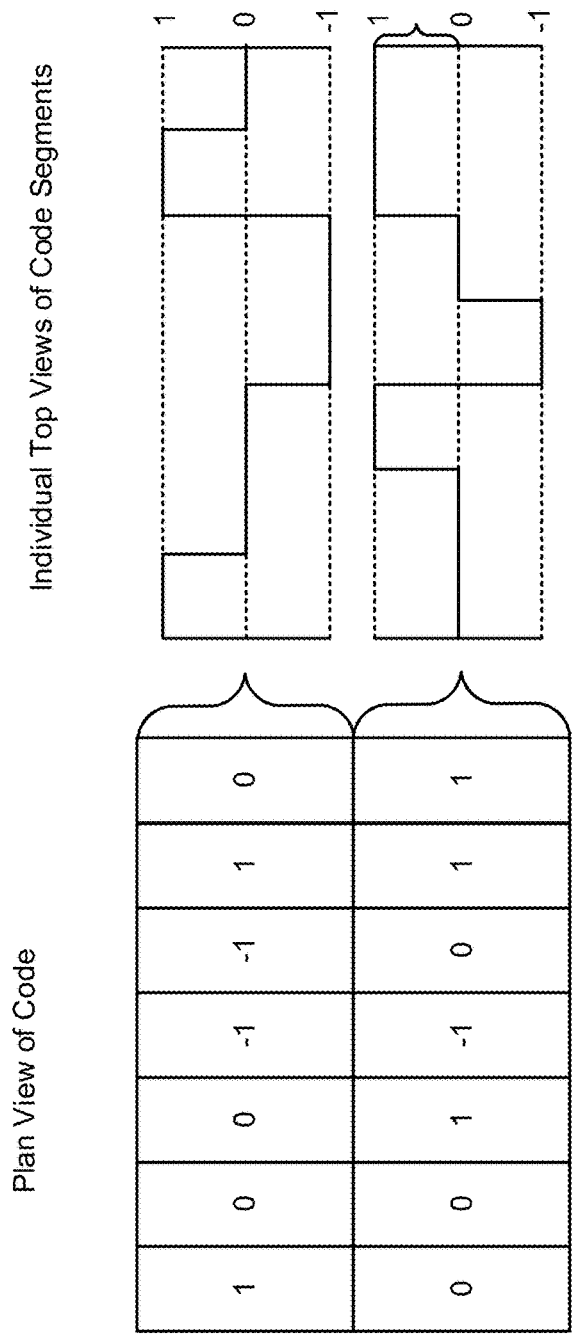
Figure 4B:
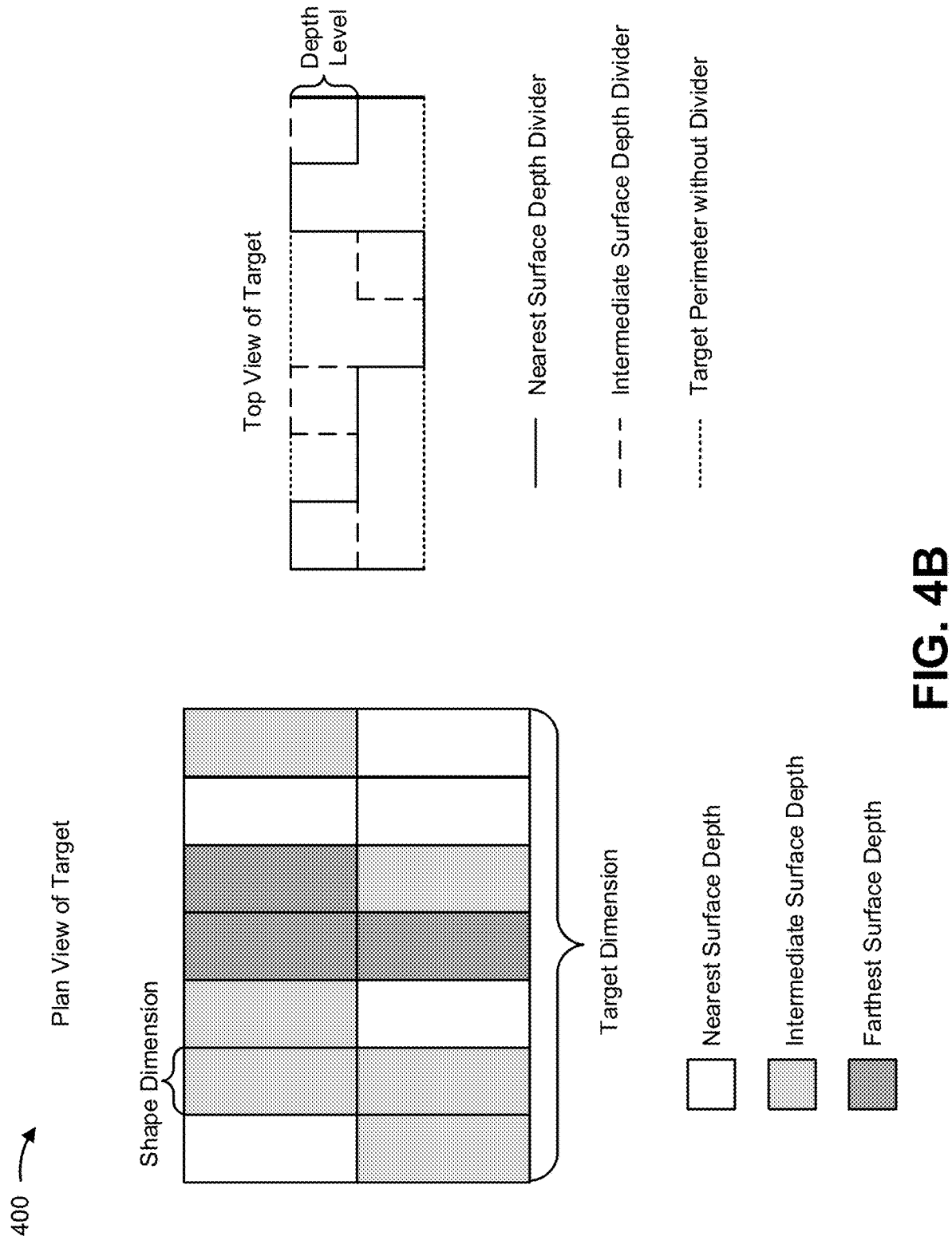

FIGS. 4A and 4B are diagrams conceptually illustrating an example 400 associated with target generation for sensor calibration in accordance with various aspects of the present disclosure. Example 400 includes an example code generation of a target. As described herein, the configuration device may perform a partitioning process to divide the target into a plurality of partitions according to one or more target dimensions. In such cases, the surface depths may be shaped in the physical configuration of the target and have a shape dimension that is based on the target dimension. In some implementations, the surface depths may correspond to equal partitions, symmetrically shaped partitions, and/or the like.

Referring to example 400 in FIGS. 4A and 4B, the configuration device may have determined that the target is to include 14 surface depths in two segments of seven surface depths. Correspondingly, the configuration device may determine that two code segments of seven code values are to be determined to generate the code.

Additionally, or alternatively, based on the target dimension (e.g., the width or height of the target), the configuration device may determine a maximum number of depth levels of the target. For example, the configuration device may be configured to limit a depth level of the target to be a particular fraction or percentage of the target dimension (e.g., a depth level may be configured to be no more than 20% of the target dimension (or a largest dimension of the target). Additionally, or alternatively, the configuration device may be configured to allow for a minimum difference between depth levels of depth surfaces of the targets (e.g., to enable the depth surfaces to be distinguishable from each other). In some implementations, the maximum number of depth levels may be based on a type of the target.

The depth levels may correspond to code values of the code. Accordingly, assuming that a target in example 400 is to have a maximum of three depth levels, the configuration device may determine that code values are to be −1, 0, and 1, corresponding to a nearest surface depth, an intermediate surface depth, and a farthest surface depth. As shown in the example of FIG. 4A, the configuration device may assign depth values to the top segment and bottom segment to generate the code.

As shown in FIG. 4B, a corresponding target may be formed (e.g., by target generation device 140) that has nearest, intermediate, and farthest surface depth levels that correspond to the depth values of the code. From a top view, dividers of the target may form a structure of the target that supports the surface depths of the target and/or enables the target to be mounted to an object so that a sensor and/or vehicle can identify the object, as described herein.

In this way, a code and/or corresponding configuration of a target can be determined by a configuration device and provided to a target generation device and/or sensor to permit the target to be identified.

As indicated above, FIG. 4 is provided merely as one or more examples. Other examples may differ from what is described with regard to FIG. 4.

Figure 5:
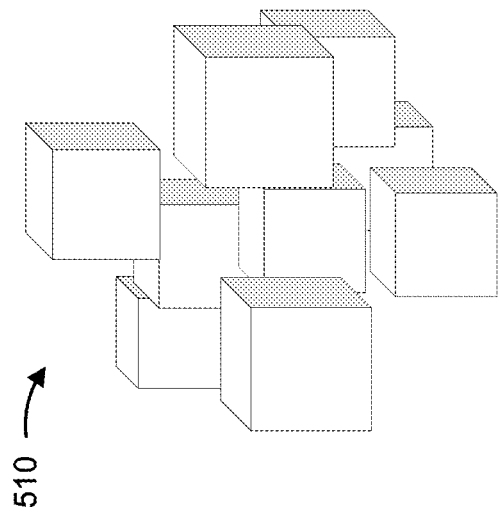
Figure 5:
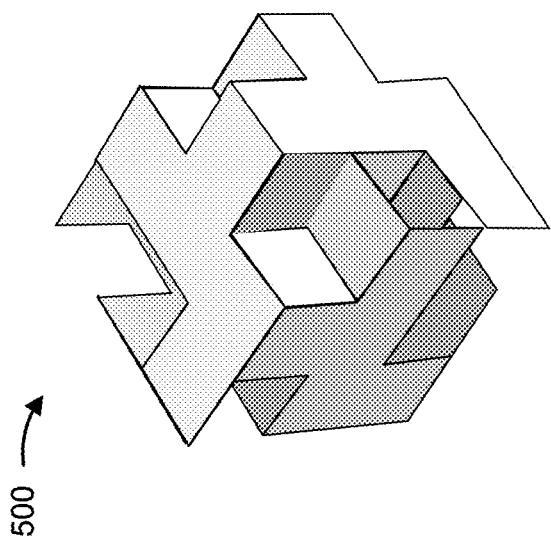

FIG. 5 is a diagram conceptually illustrating example 500 and example 510 associated with target generation for sensor calibration in accordance with various aspects of the present disclosure. Example 500 and example 510 are 3D targets that can be designed and/or formed as described herein to permit a lidar sensor to detect the target. As shown, example 500 may be formed from a plurality of dividers that provide a target with various surface depths, and example 510 may be formed from a plurality of one or more cuboids that provide a target with various surface depths.

As indicated above, FIG. 5 is provided merely as one or more examples. Other examples may differ from what is described with regard to FIG. 5.

Figure 6:
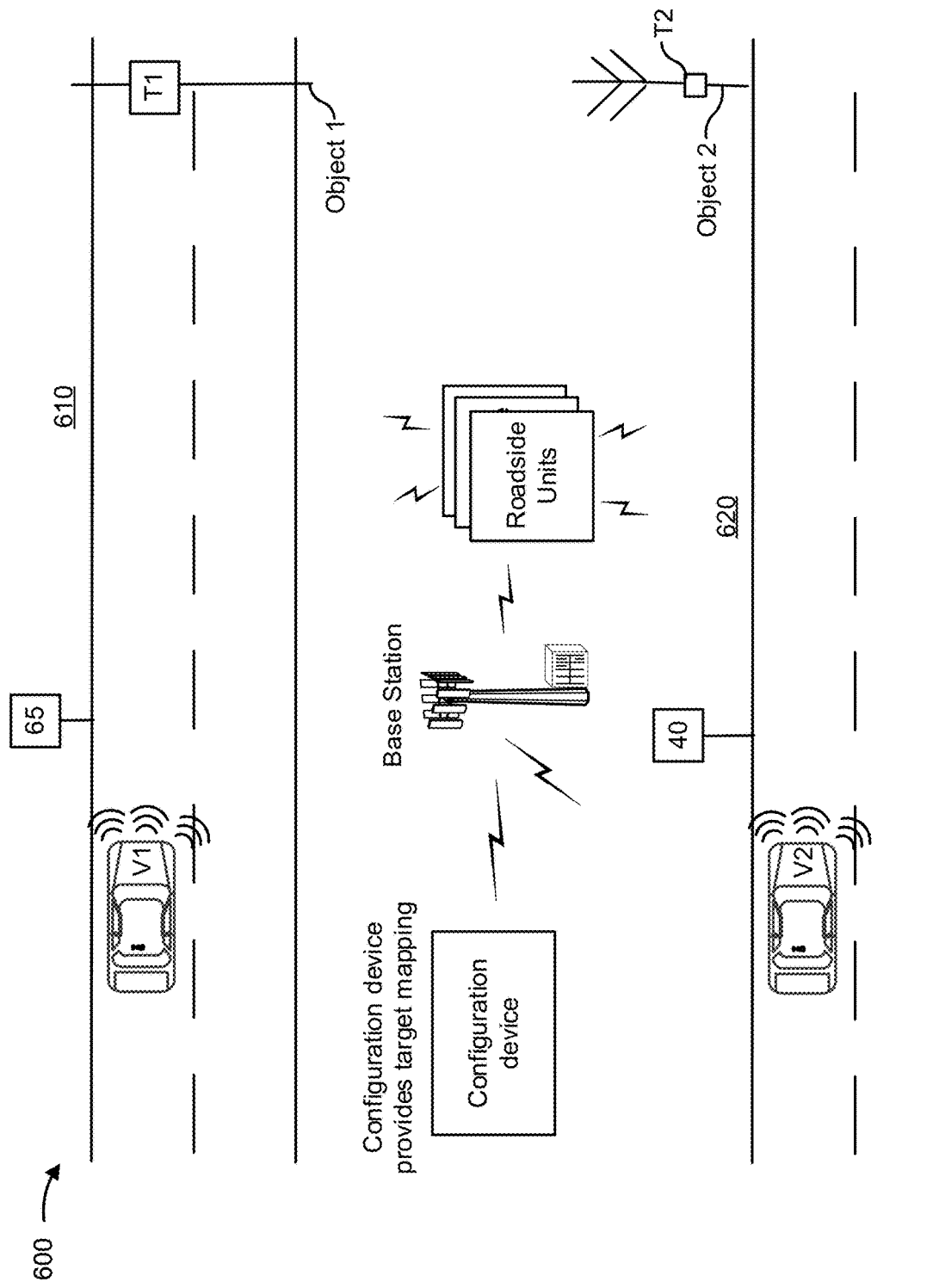

FIG. 6 is a diagram conceptually illustrating an example 600 associated with target generation for sensor calibration in accordance with various aspects of the present disclosure. Example 600 includes a configuration device, a base station, one or more roadside units (RSU) (referred to individually as an "RSU" and collectively as "RSUs"), a first vehicle ("V1"), and a second vehicle ("V2"). As shown, the first vehicle is traveling on a first roadway that includes a first target ("T1"), and the second vehicle is traveling on a second roadway that includes a second target ("T2").

As described herein, the configuration device may send a mapping of the targets (T1 and T2) to objects associated with the targets to the vehicles (V1 and V2) (e.g., via the base station and/or the RSUs) to calibrate one or more sensors of the vehicles to detect the targets. In some implementations, the vehicles may receive the mappings based on being in communication with the base station and/or the RSUs. For example, based on the vehicles coming within range of the base station and/or RSUs, the base station and/or RSUs may send mappings associated with the targets that are associated with the roadways (which are in the areas of the base station and/or the RSUs). In this way, the vehicles (and/or sensors of the vehicles) may receive target mappings, in real-time, to permit the vehicles to identify and/or detect targets as the vehicles approach the targets. In such cases, the vehicles and/or sensors may not be required to store mappings of targets in areas that the vehicles are unlikely to encounter (thus conserving computing resources associated with searching through and/or storing unnecessary mappings for targets that are not going to be encountered by the vehicles).

As shown in FIG. 6, and by reference number 610, the first target is positioned over the first roadway on a first object (Object 1) (e.g., such as an overhead sign). Furthermore, the designated speed limit for the first roadway is shown as 65 kph. As shown by reference number 620, the second target is positioned adjacent the second roadway on a second object (Object 2) (e.g., such as a particular type of tree). Further, the designated speed limit for the second roadway is shown as 40 kph. Assuming that the sizes of the first target and the second target are to scale, relative to each other, in example 600, the size of the second target is considerably smaller than the size of the first target. For example, according to aspects of this disclosure, the configuration device may have determined that a size of the first target is to be larger than the size of the second target due to the fact that the speed limit is faster on the first roadway than the second roadway (and thus the exposure time of the first target for sensors on the first roadway is shorter than the exposure time of the second target for sensors on the second roadway). Additionally, or alternatively, the configuration device may determine that, due to characteristics of the objects (e.g., as indicated in target information), the second target is to be relatively smaller than the first target (e.g., to preserve the aesthetic appearance of the second object (e.g., a tree) and/or due to the second object being less crucial for safety than the first object.

In this way, the configuration device may design a target, enable the target to be generated and/or positioned in association with a roadway, and/or may provide a target mapping for the target to vehicles traveling along the roadway to permit the vehicles to detect the targets and/or determine information associated with objects of the targets.

As indicated above, FIG. 6 is provided merely as one or more examples. Other examples may differ from what is described with regard to FIG. 6.

Figure 7:
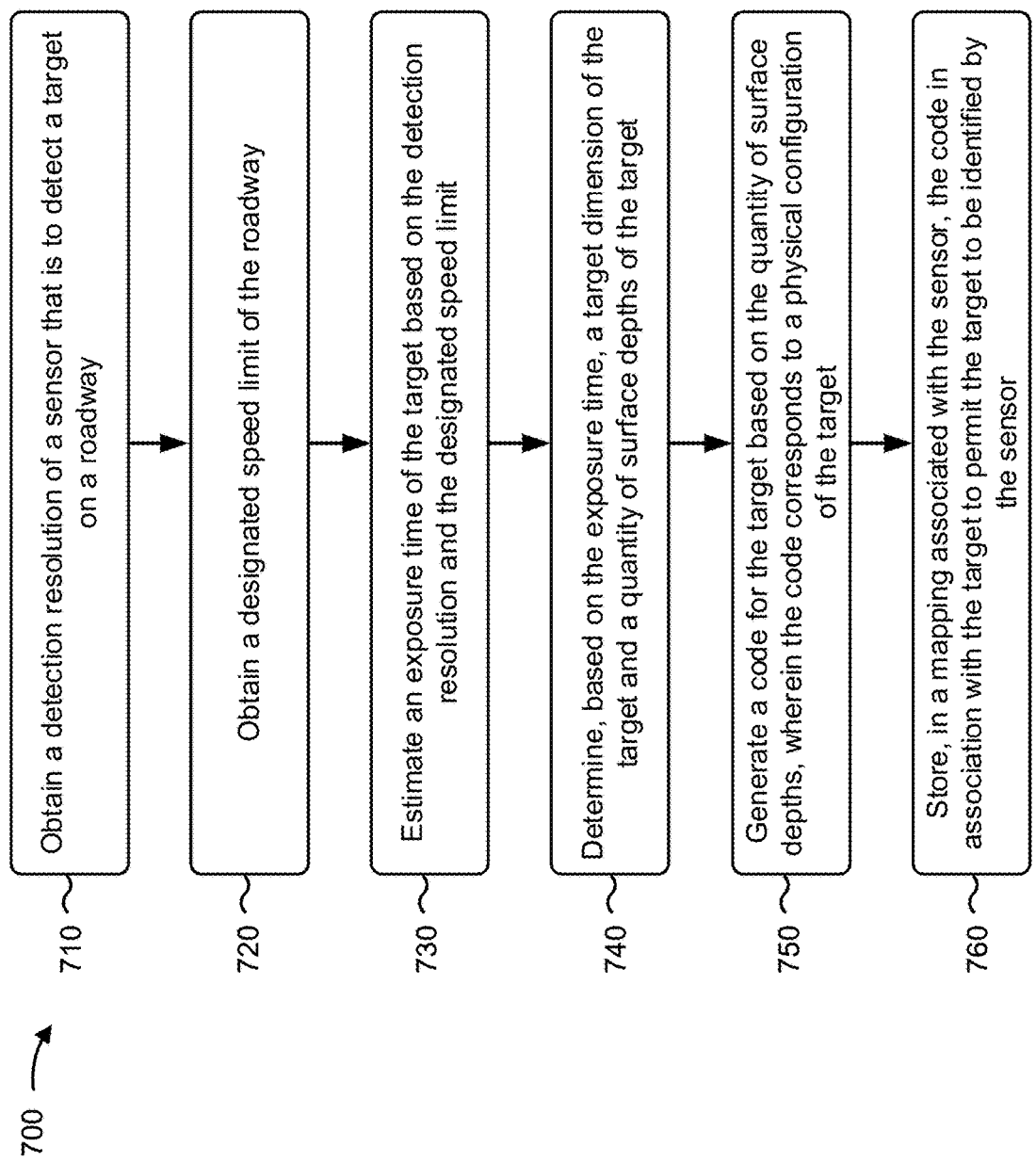
FIG. 7 is a flowchart of an example process associated with target generation for sensor calibration.

FIG. 7 is a flow chart of an example process 700 for target generation for sensor calibration. In some implementations, one or more process blocks of FIG. 7 may be performed by a configuration device (e.g., configuration device 110). In some implementations, one or more process blocks of FIG. 7 may be performed by another device or a group of devices separate from or including the configuration device, such as an ECU (e.g., ECU 112), a target generation device (e.g., target generation device 140), and/or the like.

As shown in FIG. 7, process 700 may include obtaining a detection resolution of a sensor that is to detect a target on a roadway (block 710). For example, the configuration device (e.g., processor 220, memory 230, storage component 240, input component 250, output component 260, communication interface 270, sensor 280 and/or the like) may obtain a detection resolution of a sensor that is to detect a target on a roadway, as described above.

As further shown in FIG. 7, process 700 may include obtaining a designated speed limit of the roadway (block 720). For example, the configuration device (e.g., processor 220, memory 230, storage component 240, input component 250, output component 260, communication interface 270, sensor 280 and/or the like) may obtain a designated speed limit of the roadway, as described above.

As further shown in FIG. 7, process 700 may include estimating an exposure time of the target based on the detection resolution and the designated speed limit (block 730). For example, the configuration device (e.g., processor 220, memory 230, storage component 240, input component 250, output component 260, communication interface 270, sensor 280 and/or the like) may estimate an exposure time of the target based on the detection resolution and the designated speed limit, as described above.

As further shown in FIG. 7, process 700 may include determining, based on the exposure time, a target dimension of the target and a quantity of surface depths of the target (block 740). For example, the configuration device (e.g., processor 220, memory 230, storage component 240, input component 250, output component 260, communication interface 270, sensor 280 and/or the like) may determine, based on the exposure time, a target dimension of the target and a quantity of surface depths of the target, as described above.

As further shown in FIG. 7, process 700 may include generating a code for the target based on the quantity of surface depths, wherein the code corresponds to a physical configuration of the target (block 750). For example, the configuration device (e.g., processor 220, memory 230, storage component 240, input component 250, output component 260, communication interface 270, sensor 280 and/or the like) may generate a code for the target based on the quantity of surface depths, as described above. In some aspects, the code corresponds to a physical configuration of the target.

As further shown in FIG. 7, process 700 may include storing, in a mapping associated with the sensor, the code in association with the target to permit the target to be identified by the sensor (block 760). For example, the configuration device (e.g., processor 220, memory 230, storage component 240, input component 250, output component 260, communication interface 270, sensor 280 and/or the like) may store, in a mapping associated with the sensor, the code in association with the target to permit the target to be identified by the sensor, as described above.

Process 700 may include additional implementations, such as any single implementation or any combination of implementations described below and/or in connection with one or more other processes described elsewhere herein.

In a first implementation, the code is generated by determining respective depth values for the surface depths, wherein the respective depth values correspond to respective depth levels of the surface depths of the physical configuration of the target.

In a second implementation, alone or in combination with the first implementation, the surface depths are shaped in the physical configuration of the target and have a shape dimension that is based on the target dimension. In a third implementation, alone or in combination with one or more of the first and second implementations, the quantity of surface depths is determined based on the target dimension and a uniqueness factor associated with the target.

In a fourth implementation, alone or in combination with one or more of the first through third implementations, the target is configured to be identified by the sensor when the sensor is traveling along the roadway at a speed that is within a threshold range associated with the designated speed limit.

In a fifth implementation, alone or in combination with one or more of the first through fourth implementations, the detection resolution comprises an azimuthal angular resolution and the exposure time is estimated based on a maximum operational distance associated with the azimuthal angular resolution. In a sixth implementation, alone or in combination with one or more of the first through fifth implementations, the detection resolution comprises an elevation angular resolution and the exposure time is estimated based on a minimum operational distance associated with the elevation angular resolution.

In a seventh implementation, alone or in combination with one or more of the first through sixth implementations, the configuration device may at least one of: notify a control device associated with the sensor that the mapping includes the code, provide the mapping to the control device associated with the sensor to calibrate the sensor, or provide the mapping to a target generation device to enable the physical configuration of the target to be created. In an eighth implementation, alone or in combination with one or more of the first through seventh implementations, the sensor comprises a lidar sensor.

In a ninth implementation, alone or in combination with one or more of the first through eight implementations, the exposure time is estimated based on a maximum operational distance associated with an azimuthal angular resolution associated with the detection resolution or a minimum operational distance associated with an elevation angular resolution associated with the detection resolution.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    obtaining, by a device, a detection resolution of a sensor that is to detect a target, wherein the target is configured to be associated with an object located on, or within a distance from, a roadway;
    obtaining, by the device, a designated speed limit of the roadway;
    estimating, by the device, an exposure time of the target based on the detection resolution and the designated speed limit;
    determining, by the device and based on the exposure time, a target dimension of the target and a quantity of surface depths of the target;
    generating, by the device, a code for the target based on the quantity of surface depths,
        wherein the code corresponds to a physical configuration of the target; and
    storing, by the device and in a mapping associated with the sensor, the code in association with the target to permit the target to be identified by the sensor.

2. The method of claim 1, wherein the code is generated by determining respective depth values for the surface depths,
    wherein the respective depth values correspond to respective depth levels of the surface depths of the physical configuration of the target.

3. The method of claim 1, wherein the surface depths are shaped in the physical configuration of the target and have a shape dimension that is based on the target dimension.

4. The method of claim 1, wherein the quantity of surface depths is determined based on the target dimension and a uniqueness factor associated with the target.

5. The method of claim 1, wherein the target is configured to be identified by the sensor when the sensor is traveling along the roadway at a speed that is within a threshold range associated with the designated speed limit.

6. The method of claim 1, wherein the detection resolution comprises an azimuthal angular resolution and the exposure time is estimated based on a maximum operational distance associated with the azimuthal angular resolution.

7. The method of claim 1, wherein the detection resolution comprises an elevation angular resolution and the exposure time is estimated based on a minimum operational distance associated with the elevation angular resolution.

8. The method of claim 1, further comprising at least one of:
    notifying a control device associated with the sensor that the mapping includes the code,
    providing the mapping to the control device associated with the sensor to calibrate the sensor, or
    providing the mapping to a target generation device to enable the physical configuration of the target to be created.

9. The method of claim 1, wherein the sensor comprises a lidar sensor.

10. A device, comprising:
    one or more memories; and
    one or more processors, communicatively coupled to the one or more memories, configured to:
        obtain a detection resolution of a sensor that is to detect a target, wherein the target is configured to be associated with an object located on, or within a distance from, a roadway;
        obtain a designated speed limit of the roadway;
        estimate an exposure time of the target based on the detection resolution and the designated speed limit;
        determine, based on the exposure time, a target dimension of the target and a quantity of surface depths of the target;
        generate a code for the target based on the quantity of surface depths,
            wherein the code corresponds to a physical configuration of the target; and
        store, in a mapping associated with the sensor, the code in association with the target to permit the target to be identified by the sensor.

11. The device of claim 10, wherein the code is generated by determining respective depth values for the surface depths,
    wherein the respective depth values correspond to respective depth levels of the surface depths of the physical configuration of the target.

12. The device of claim 10, wherein the surface depths are shaped in the physical configuration of the target and have a shape dimension that is based on the target dimension.

13. The device of claim 10, wherein the quantity of surface depths is determined based on the target dimension and a uniqueness factor associated with the target.

14. The device of claim 10, wherein the target is configured to be identified by the sensor when the sensor is traveling along the roadway at a speed that is within a threshold range associated with the designated speed limit.

15. The device of claim 10, wherein the detection resolution comprises an azimuthal angular resolution and the exposure time is estimated based on a maximum operational distance associated with the azimuthal angular resolution.

16. The device of claim 10, wherein the detection resolution comprises an elevation angular resolution and the exposure time is estimated based on a minimum operational distance associated with the elevation angular resolution.

17. The device of claim 10, wherein the one or more processors are to at least one of:
notify a control device associated with the sensor that the mapping includes the code,
provide the mapping to the control device associated with the sensor to calibrate the sensor, or
provide the mapping to a target generation device to enable the physical configuration of the target to be created.

18. The device of claim 10, wherein the sensor comprises a lidar sensor.

19. A non-transitory computer-readable medium storing instructions, the instructions comprising:
one or more instructions that, when executed by one or more processors, cause the one or more processors to:
obtain a detection resolution of a sensor that is to detect a target, wherein the target is configured to be associated with an object located on, or within a distance from, a roadway;
obtain a designated speed limit of the roadway;
estimate an exposure time of the target based on the detection resolution and the designated speed limit;
determine, based on the exposure time, a target dimension of the target and a quantity of surface depths of the target;
generate a code for the target based on the quantity of surface depths,
wherein the code corresponds to a physical configuration of the target; and
store, in a mapping associated with the sensor, the code in association with the target to permit the target to be identified by the sensor.

20. The non-transitory computer-readable medium of claim 19, wherein the code is generated by determining respective depth values for the surface depths,
wherein the respective depth values correspond to respective depth levels of the surface depths of the physical configuration of the target.

21. The non-transitory computer-readable medium of claim 19, wherein the quantity of surface depths is determined based on the target dimension and a uniqueness factor associated with the target.

22. The non-transitory computer-readable medium of claim 19, wherein the exposure time is estimated based on:
a maximum operational distance associated with an azimuthal angular resolution associated with the detection resolution, or
a minimum operational distance associated with an elevation angular resolution associated with the detection resolution.

23. The non-transitory computer-readable medium of claim 19, wherein the one or more instructions, when executed by the one or more processors, further cause the one or more processors to at least one of:
notify a control device associated with the sensor that the mapping includes the code,
provide the mapping to the control device associated with the sensor to calibrate the sensor, or
provide the mapping to a target generation device to enable the physical configuration of the target to be created.

24. The non-transitory computer-readable medium of claim 19, wherein the sensor comprises a lidar sensor.

25. An apparatus, comprising:
means for obtaining a detection resolution of a sensor that is to detect a target, wherein the target is configured to be associated with an object located on, or within a distance from, a roadway;
means for obtaining a designated speed limit of the roadway;
means for estimating an exposure time of the target based on the detection resolution and the designated speed limit;
means for determining, based on the exposure time, a target dimension of the target and a quantity of surface depths of the target;
means for generating a code for the target based on the quantity of surface depths,
wherein the code corresponds to a physical configuration of the target; and
means for storing, in a mapping associated with the sensor, the code in association with the target to permit the target to be identified by the sensor.

26. The apparatus of claim 25, wherein the code is generated by determining respective depth values for the surface depths,
wherein the respective depth values correspond to respective depth levels of the surface depths of the physical configuration of the target.

27. The apparatus of claim 25, wherein the quantity of surface depths is determined based on the target dimension and a uniqueness factor associated with the target.

28. The apparatus of claim 25, wherein the exposure time is estimated based on:
a maximum operational distance associated with an azimuthal angular resolution associated with the detection resolution, or
a minimum operational distance associated with an elevation angular resolution associated with the detection resolution.

29. The apparatus of claim 25, further comprising at least one of:
means for notifying a control device associated with the sensor that the mapping includes the code,
means for providing the mapping to the control device associated with the sensor to calibrate the sensor, or
means for providing the mapping to a target generation device to enable the physical configuration of the target to be created.

30. The apparatus of claim 25, wherein the sensor comprises a lidar sensor.

* * * * *